W. A. UNDERHILL & C. C. AVERY.
VEHICLE TRAIN COUPLING.
APPLICATION FILED DEC. 2, 1914.
1,150,466.
Patented Aug. 17, 1915.
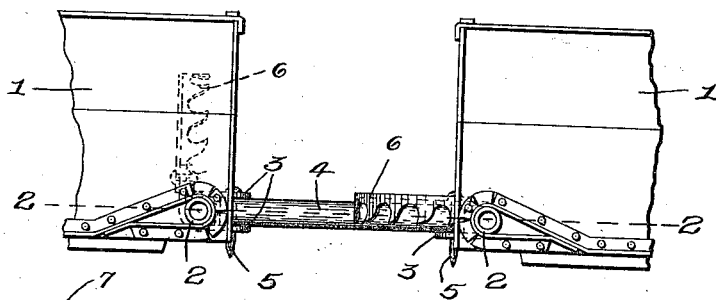
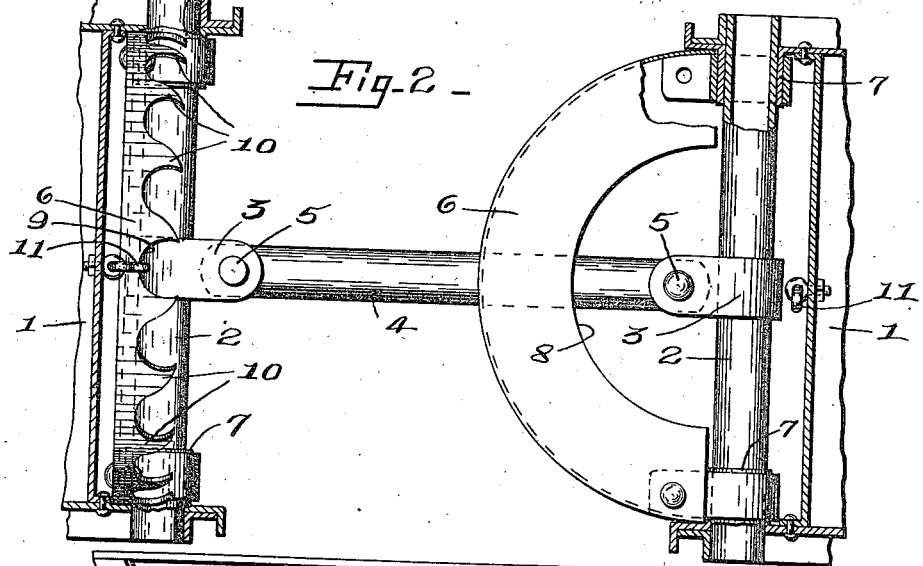
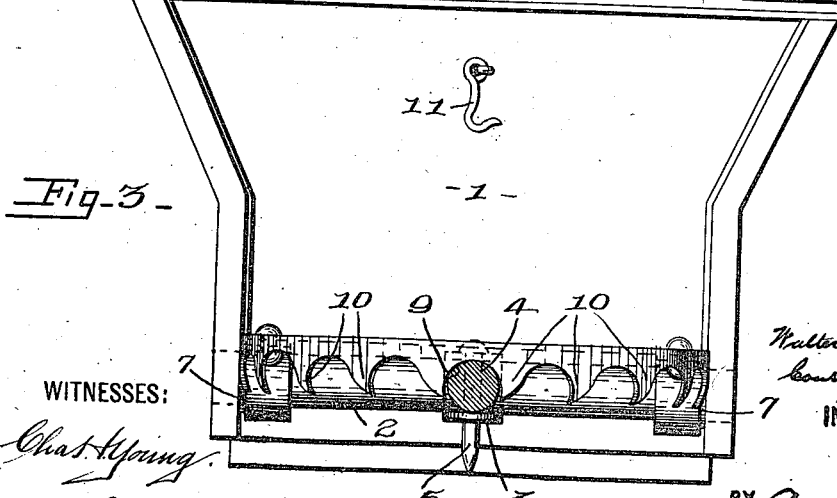

UNITED STATES PATENT OFFICE.

WALTER A. UNDERHILL AND COURTNEY C. AVERY, OF AUBURN, NEW YORK, ASSIGNORS TO THE EAGLE WAGON WORKS, OF AUBURN, NEW YORK, A CORPORATION OF NEW YORK.

VEHICLE TRAIN-COUPLING.

1,150,466.      Specification of Letters Patent.      Patented Aug. 17, 1915.

Application filed December 2, 1914. Serial No. 875,162.

*To all whom it may concern:*

Be it known that we, WALTER A. UNDERHILL and COURTNEY C. AVERY, citizens of the United States, and residents of Auburn, in the county of Cayuga and State of New York, have invented a certain new and useful Vehicle Train-Coupling, of which the following is a specification.

Our invention relates to improvements in vehicles, and particularly to a vehicle train coupling, which is simple in construction, efficient in operation and durable in use; and to this end, it consists in the combinations and constructions hereinafter described and claimed.

In describing this invention, reference is had to the accompanying drawing in which like characters designate corresponding parts in all the views.

Figure 1 is a side elevation of the opposing ends of two contiguous vehicles embodying our invention. Fig. 2 is a horizontal section on line 2—2, Fig. 1, a portion of one of the holding members being shown in section. Fig. 3 is an end view of the portion of one of the vehicles shown in Fig. 1, the connecting or draw bar being illustrated in section.

1, 1 are opposing vehicle boxes or bodies, which may be of any desirable form, size and construction. These boxes or bodies form supports for the holding members, presently described.

2, 2 are a pair of bars mounted respectively on the boxes 1, with their longitudinal axes disposed at substantially a right angle to the line of draft. Said bars 2 are preferably movable about their longitudinal axes, and are provided with ears 3 fixed thereto and projecting laterally from the opposing surfaces of their intermediate portions. As the vehicles move along the road, the bars 2 also move relatively to each other in directions at an angle to their longitudinal axes.

4 is a connecting bar having its opposite ends secured to the ears 3 by pivotal connections, as pins 5, having their axes disposed at substantially right angles to the longitudinal axes of the bars 2, 2.

6, 6, are holding members pivotally secured to the opposing ends of the boxes or bodies 1, and coacting with the bar 4. The members 6 are preferably movable about the longitudinal axes of the bars 2, 2, and are journaled at their ends upon bearings 7 having their peripheries concentric with said longitudinal axes. It will be obvious, however, to those skilled in the art, that the members 6 may be journaled directly on the bars 2. Preferably, the members 6 are arranged above the bar 4 and their sides nearest the boxes 1 are formed with cutouts 8 which receive the ears 3 and the contiguous parts of the bar 4. By providing the members 6 with the cutouts 8, as illustrated, said members may be arranged close to the bar 4 and may be of considerable width, without unduly limiting the relative movement of the bar 4 and the members 6. It will be obvious, however, to those skilled in the art, that the cutouts 8 may be omitted.

The sides of the holding members opposite to the sides thereof provided with the cutouts 8 are formed with depending flanges, the lower edges of which are each formed with a central socket 9 for receiving and substantially fitting the contiguous portion of the bar 4, and with ratchet teeth 10 on opposite sides of the socket 9. The teeth 10 at opposite sides of the sockets 9, and particularly the sides thereof farthest from the sockets, incline in opposite directions toward said sockets.

Each box 1 is provided with suitable means as a hook 11, for engaging and supporting the free portion of the corresponding holding member 6 when swung upwardly out of engagement with the bar 4.

Ordinarily, in the use of our invention, the socket 9 of the holding member on the rear vehicle is in engagement with the bar 4 and prevents relative movement of said member and bar in either direction, and the opposing holding member is supported out of engagement with the bar 4 and permits the trailing vehicle to move relatively to the advance vehicle in rounding curves, etc. When the train is about to move in the opposite direction, the holding member 6 previously engaged with the bar 4 is disconnected therefrom and held out of position to engage with the bar 4, and the other holding member, previously disconnected from said draw bar, is lowered to its normal position, but usually the ratchet teeth at one side of the central socket 9 of the depressed holding member engage with said bar. As the train moves in this reverse direction, the bar 4 naturally moves tooth by tooth relatively to the depressed holding member to the predetermined or intermediate position of said bar in engagement with the socket of said holding member, whereupon relative movement of the draw bar and said holding member is prevented. Sometimes, as when backing a train, both holding members 6 are arranged with their sockets 9 coacting with the bar 4.

What we claim, is:—

1. In combination, two members, one a bar movable about an axis disposed at substantially right angles to the longitudinal axis of the bar, and the other a holding member movable about an axis extending at substantially right angles to the axis about which the bar is movable, one of said members being provided with means coacting with the other member for preventing relative movement of said members in either direction, and with additional means coacting with the other member for preventing relative movement of said members in one direction and permitting such movement in the opposite direction, substantially as and for the purpose described.

2. In combination, two members, one a bar movable about an axis disposed at substantially right angles to the longitudinal axis of the bar, and the other a holding member movable about an axis extending at substantially right angles to the axis about which the bar is movable, one of said members being provided with ratchet teeth for coacting successively with the other member as the bar swings about its pivotal axis, said teeth being arranged at opposite sides of the longitudinal axis of the bar when said members are in a predetermined position relatively to each other, and with the teeth at opposite sides of said longitudinal axis inclining in opposite directions relatively to the bar, substantially as and for the purpose specified.

3. In combination, a support, and two members, one a bar movable relatively to the support about an axis disposed at substantially right angles to the longitudinal axis of the bar, and the other a holding member pivotally connected to the support and having its pivotal axis extending at substantially right angles to the axis about which the bar is movable, one of said members being provided with ratchet teeth for coacting successively with the other member as the bar swings about its pivotal axis, said teeth being arranged at opposite sides of the longitudinal axis of the bar when said members are in a predetermined position relatively to each other, and with the teeth at opposite sides of said longitudinal axis inclining in opposite directions relatively to the bar, substantially as and for the purpose set forth.

4. The combination with a connecting bar movable about a pivotal axis at each end thereof; of opposing holding members for the ends of the bar, each holding member being movable about an axis disposed at substantially a right angle to the pivotal axis of the corresponding end of the connecting bar, and being movable about its pivotal axis independently of the other holding member and relatively to the connecting bar, and each holding member being provided with means coacting with the connecting bar for preventing relative movement of the bar and the holding member in either direction, and with additional means coacting with the connecting bar for preventing relative movement of the bar and the holding member in one direction, and permitting such movement in the opposite direction, substantially as and for the purpose described.

5. The combination with a pair of opposing supports movable relatively to each other; of a connecting bar pivotally connected at its ends to the supports and having its pivotal axes disposed at substantially right angles to the longitudinal axis of the bar, and opposing holding members for the ends of the bar, each holding member being pivotally connected to one of the supports independently of the connecting bar, the holding members having their pivotal axes disposed at substantially a right angle to the first-mentioned pivotal axes, and each holding member being provided with means coacting with the connecting bar for preventing relative movement of the bar and the holding member in either direction, and with additional means coacting with the connecting bar for preventing relative movement of the bar and the holding member in one direction, and permitting such movement in the opposite direction, substantially as and for the purpose specified.

6. The combination with opposing bars movable about their longitudinal axes; of a connecting bar having its ends connected to the first-mentioned bars by pivotal connections, the axes of which are arranged at substantially a right angle to the first-mentioned axes, and independently movable opposing holding members, one being movable about each of the first-mentioned axes relatively to the other holding member and to the first-mentioned bars and the connecting bar, each holding member being provided with means coacting with the connecting bar for preventing relative movement of the bar and the holding member in either direction, and with additional means coacting with the connecting bar for preventing relative movement of the bar and the holding member in one direction, and permitting such movement in the opposite direction, substantially as and for the purpose set forth.

7. The combination with opposing bars movable relatively to each other about their longitudinal axes and also movable relatively to each other in a direction at an angle to said axes; of a connecting bar pivotally connected at its ends to the first-mentioned bars and having its pivotal axes disposed at substantially right angles to the longitudinal axis of the bar, and opposing holding members for the ends of the bar, each holding member being pivotally connected to one of the supports independently of the connecting bar, the holding members having their pivotal axes disposed at substantially a right angle to the first-mentioned pivotal axes, and each holding member being provided with means coacting with the connecting bar for preventing relative movement of the bar and the holding member in either direction, and with additional means coacting with the connecting bar for preventing relative movement of the bar and the holding member in one direction, and permitting such movement in the opposite direction, substantially as and for the purpose described.

8. In combination, a support and two members, one a bar movable relatively to the support about an axis disposed at substantially right angles to the longitudinal axis of the bar, and the other a holding member pivotally connected to the support and having its pivotal axis extending at substantially right angles to the axis about which the bar is movable, said holding member being provided with a substantially centrally arranged open sided socket for coacting with the contiguous portion of the connecting bar, and preventing relative movement of the connecting bar and the holding member in either direction, and with reversely inclined ratchet teeth on opposite sides of the socket, each series of the teeth preventing relative movement of the connecting bar and the holding member in one direction, and permitting such movement in an opposite direction, substantially as and for the purpose specified.

9. The combination with opposing bars movable relatively to each other about their longitudinal axes and also movable relatively to each other in a direction at an angle to said axes; of a connecting bar having its ends connected to the first-mentioned bars by pivotal connections having their axes arranged at substantially a right angle to the first-mentioned axes, and independently movable opposing holding members, one being movable about each of the first-mentioned axes relatively to the other holding member and to the first-mentioned bars and the connecting bar, each holding member being provided with a substantially centrally arranged open-sided socket for coacting with the contiguous portion of the connecting bar, and preventing relative movement of the connecting bar and the holding member in either direction, and with reversely inclined ratchet teeth on opposite sides of the socket, each series of the teeth preventing relative movement of the connecting bar and the holding member in one direction, and permitting such movement in an opposite direction, substantially as and for the purpose set forth.

10. In a vehicle train coupling, a connecting bar having its ends pivotally connected to contiguous vehicles, and a holding member pivoted independently of the connecting bar to one vehicle about an axis disposed at substantially right angles to the pivotal axes of the connecting bar and provided with means coacting with the connecting bar for preventing relative movement of the bar and the holding member in either direction, and with additional means coacting with the connecting bar for preventing relative movement of the bar and the holding member in one direction, and permitting such movement in the opposite direction, substantially as and for the purpose described.

11. In a vehicle train coupling, a pair of ears projecting from the opposing surfaces of contiguous vehicles, a connecting bar having its ends connected to said ears by pivotal connections having their axes arranged at substantially a right angle to the longitudinal axis of the connecting bar, and a holding member arranged above the connecting bar and connected to one of the vehicles by a pivotal connection having its axis arranged at substantially a right angle to the first-mentioned axes, the side of the holding member nearest the vehicle provided therewith having a cutout for receiving the contiguous ear, said holding member being provided with means coacting with the connecting bar for preventing relative movement of the bar and the holding member in either direction, and with additional means coacting with the connecting bar for preventing relative movement of the bar and the holding member in one direction, and permitting such movement in the opposite direction, substantially as and for the purpose specified.

12. In a vehicle train coupling, a connecting bar having its ends connected to contiguous vehicles by pivotal connections having their axes arranged at substantially a right angle to the longitudinal axis of the connecting bar, and a holding member arranged above the connecting bar and connected to one of the vehicles by a pivotal connection having its axis arranged at substantially a right angle to the first-mentioned axes, the side of the holding member farthest from the vehicle provided therewith having a depending flange formed with a substantially central socket for receiving the contiguous portion of the connecting bar and preventing relative movement of the bar and the holding member in either direction, said flange being also formed with reversely inclined ratchet teeth on opposite sides of the socket, each series of teeth preventing relative movement in one direction of the connecting bar and the holding member provided with said teeth and permitting such relative movement in the opposite direction, substantially as and for the purpose set forth.

13. In a vehicle train coupling, a pair of bars mounted on the opposing ends of a pair of vehicles, the bars being movable about their longitudinal axes and having such longitudinal axes disposed at substantially a right angle to the line of draft, and said bars having ears projecting from their opposing surfaces, bearings provided on the ends of said vehicles and having bearing surfaces substantially concentric with the longitudinal axes of the bars, a connecting bar having its ends connected to said ears by pivotal connections having their axes disposed at substantially a right angle to the first-mentioned axes, and holding members mounted on said bearings and movable about the first-mentioned axes independently of each other, and relatively to the pair of bars and the connecting bar, the sides of the holding members nearest the ends of the vehicles having cutouts for receiving said ears, and the opposite sides of the holding members being provided with depending flanges, each flange being formed with a substantially central socket for receiving the contiguous portion of the corresponding connecting bar and preventing relative movement of the bar and the holding member in either direction, said flange being also formed with reversely inclined ratchet teeth on opposite sides of the socket, each series of teeth preventing relative movement in one direction of the connecting bar and the holding member provided with said teeth and permitting such relative movement in the opposite direction, substantially as and for the purpose set forth.

In testimony whereof, we have hereunto signed our names in the presence of two attesting witnesses, at Syracuse, in the county of Onondaga, in the State of New York, this 30th day of November, 1914.

WALTER A. UNDERHILL.
COURTNEY C. AVERY.

Witnesses:
S. DAVIS,
F. B. PICKARD.